No. 671,535. Patented Apr. 9, 1901.
R. BRYAN-HAYMES.
PNEUMATIC TIRE AND WHEEL RIM THEREFOR.
(Application filed Oct. 26, 1900.)
(No Model.)

Witnesses
Inventor
Robert Bryan-Haymes

UNITED STATES PATENT OFFICE.

ROBERT BRYAN-HAYMES, OF KINGSBRIDGE, ENGLAND.

PNEUMATIC TIRE AND WHEEL-RIM THEREFOR.

SPECIFICATION forming part of Letters Patent No. 671,535, dated April 9, 1901.

Application filed October 26, 1900. Serial No. 34,461. (No model.)

*To all whom it may concern:*

Be it known that I, ROBERT BRYAN-HAYMES, a subject of the Queen of Great Britain and Ireland, residing at Kingsbridge, in the county of Devon, England, have invented Improvements in and Connected with Pneumatic Tires and Wheel-Rims Therefor, of which the following is a specification.

This invention has for its object the provision of wheels with pneumatic tires that will not be liable to punctures. For this purpose according to this invention a thick annular bearing-strip, of india-rubber, is held in place around the air-tube by two opposite side rings which are connected to the rim in such a way that the rim can move radially relatively to the side rings to allow the elasticity of the pneumatic tire to come into action.

Figure 1:
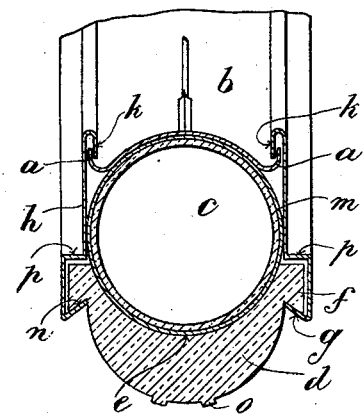
Figure 2:
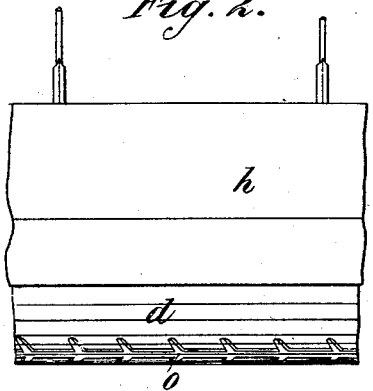
Figure 3:
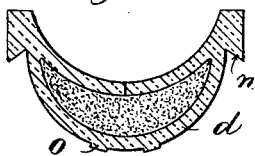
Figure 4:
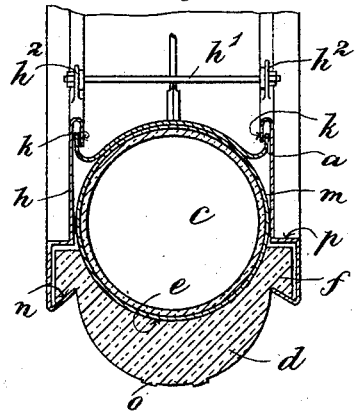
Figure 5:
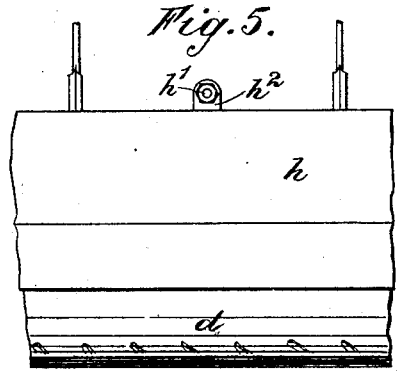

Figures 1 and 2 of the accompanying illustrative drawings show, respectively, in cross-section and side elevation part of one example of a wheel-rim and a pneumatic tire secured thereon according to this invention. Fig. 3 is a cross-section of another example of a bearing-strip, and Figs. 4 and 5 are views corresponding to Figs. 1 and 2 of another example of a wheel-rim and a pneumatic tire secured thereon according to this invention.

In the example shown in Figs. 1 and 2 the edges $a$ of the rim $b$ of the wheel are made to project inward—*i. e.*, toward the axis of the wheel—and the thick rubber bearing-strip $d$, which has a concave recess $e$ for the air-tube $c$ to fit into, is provided at its edges with projections $f$, that engage with the hooked outer edges $g$ of the two metal side rings $h$, which after they have been put into position are bent so that their inner edges $k$ project outward and engage with the inwardly-projecting edges $a$ of the rim $b$, which prevent them from moving apart. The two side rings $h$ may be connected together at intervals, as by bolts or screwed rods $h'$, secured by nuts to lugs $h^2$, projecting inward from the rings, so that they form practically one piece, as shown in Figs. 4 and 5. Usually, however, such connections will be unnecessary. The side rings $h$ are preferably so shaped and arranged that when the air-tube $c$ is inflated it will bear against the side rings $h$, as shown, so as to keep the rings and the air-tube in position.

As will be seen, the engagement of the edges $a$ and $k$ of the rim $b$ and the side rings $h$, respectively, is such as to allow the rim $b$ to move radially within and in relation to the side rings $h$ as required by the elasticity of and variations in the inflation of the air-tube $c$ and at the same time to exclude to a great extent dust from the chamber $m$, containing the air-tube, and formed by the bearing-strip $d$, the two side rings $h$, and the rim $b$. The surfaces of the recesses $n$, formed between the body of the bearing-strip $d$ and its projections $f$, may, if desired, be protected, as by a covering of canvas, from being injured by the edges $g$ of the side rings $h$. The bearing-strip $d$, which is made thick enough to prevent the air-tube from being punctured, may be either solid, as shown in Figs. 1 and 2, or hollow, as shown in Fig. 3, and in the latter case it may be filled with a suitable material, as horsehair or cork. To give further security against side slipping and a better grip, the periphery of the bearing-strip $d$ may, as shown in Figs. 1, 2, 4, and 5, be provided with projections $o$ or recesses shaped like broad arrows. The air-tube $c$ is provided with a valve whose tube projects through the rim $b$ in the ordinary way and is suitably secured to the rim. The side rings $h$ are preferably formed with shoulders $p$, against which the projections $f$ of the bearing-strip $d$ will bear if the air-tube $c$ become accidentally deflated.

What I claim is—

1. In a pneumatic-tired wheel, the combination of a wheel-rim, an air-tube surrounding and fitting said rim, a thick bearing-strip surrounding and bearing upon said tube and two side rings connected to the said strip and to the said rim so as to hold the said strip in place around the said air-tube and to allow the said rim to move radially in relation to the said rings to enable the elasticity of the said air-tube to come into action.

2. In a pneumatic-tired wheel, the combination of a wheel-rim, an air-tube surrounding and fitting said rim, a thick bearing-strip surrounding and bearing upon said air-tube, and two side rings for securing the said bearing-strip to the said rim, the said rings having outwardly-projecting edges and the said rim having inwardly-projecting edges engaging therewith so as to allow the said rim to move radially in relation to the said rings to enable the elasticity of the air-tube to come into action.

3. In a pneumatic-tired wheel, the combination of a wheel-rim, an air-tube surrounding and fitting said rim, a thick bearing-strip surrounding and bearing upon said air-tube and two side rings for securing the said bearing-strip to said rim, the said rings having hooked outer edges and being connected to the said rim so as to allow the said rim to move radially in relation to the said rings to enable the elasticity of the said air-tube to come into action, and the said strip being adapted to engage with the said hooked outer edges of the said rings.

4. In a pneumatic-tired wheel, the combination of a wheel-rim, an air-tube surrounding and fitting said rim, a thick bearing-strip surrounding and bearing upon said air-tube, two side rings connected to the said strip and to the said rim so as to hold the said strip in place around the said air-tube and to allow the said rim to move radially in relation to the said rings to enable the elasticity of the said air-tube to come into action, and means for connecting the said two rings together at intervals so that they practically form one piece.

5. In a pneumatic-tired wheel, the combination of a wheel-rim, an air-tube surrounding and fitting said rim, a thick bearing-strip surrounding and bearing upon said air-tube, two side rings for securing the said bearing-strip to the said rim, the said rings having hooked outer inwardly-projecting edges and being connected to the said rim so as to allow the said rim to move radially in relation to the said rings to enable the elasticity of the said air-tube to come into action and the said strip having projections adapted to engage with the said hooked outer inwardly-projecting edges of the said rings, and rods passing through lugs on said rings for connecting the said two rings together at intervals so that they practically form one piece.

6. In a pneumatic-tired wheel, the combination of a wheel-rim, having inwardly-projecting edges, an air-tube surrounding and fitting said rim, a thick rubber bearing-strip surrounding and bearing upon air-tube and two side rings connected to the said strip and to the said rim so as to hold the said strip in place around the said air-tube and to allow the said rim to move radially in relation to the said rings to enable the elasticity of the said air-tube to come into action, the said side rings being adapted to act as abutments for the said strip in the event of the deflation of the said air-tube, substantially as described.

7. In a pneumatic-tired wheel, the combination of a wheel-rim having inwardly-projecting edges, an air-tube surrounding and fitting said rim, a recessed thick rubber bearing-strip surrounding and bearing upon said air-tube and two side rings connected to the said rim and to the said strip so as to hold the said strip in place around the said air-tube and to allow the said rim to move radially in relation to the said rings to enable the elasticity of the said air-tube to come into action, and bolts passing through lugs on said rings for connecting the said two rings together at intervals so that they practically form one piece, the said side rings having shoulders against which projections on said strip bear in the event of the deflation of the said air-tube substantially as described.

8. In a pneumatic-tired wheel, the combination of a wheel-rim having inwardly-projecting edges, an air-tube surrounding and fitting the said rim, a thick rubber bearing-strip surrounding and fitting the said air-tube and two metal side rings having outwardly-projecting inner edges engaging with the said inwardly-projecting edges of the said rim and hooked outer edges with which the said bearing-strip engages, substantially as set forth.

9. In a pneumatic-tired wheel, the combination of a wheel-rim having inwardly-projecting edges, an air-tube surrounding and fitting the said rim, a thick rubber bearing-strip surrounding and fitting the said air-tube, and two metal side rings having outwardly-projecting inner edges engaging with the said inwardly-projecting edges of the said rim and hooked outer edges with which the said bearing-strip engages, the said side rings being adapted to act as abutments for the said strip in the event of the deflation of the said air-tube.

10. In a pneumatic-tired wheel, the combination of a wheel-rim having inwardly-projecting edges, an air-tube surrounding and fitting the said rim, a thick rubber bearing-strip surrounding and fitting the said air-tube, two metal side rings having outwardly-projecting inner edges engaging with the said inwardly-projecting edges of the said rim and hooked outer edges with which the said bearing-strip engages, the said side rings being adapted to act as abutments for the said strip in the event of the deflation of the said air-tube, and means for connecting the said rings together at intervals so that they practically form one piece, substantially as set forth.

Signed at 77 Cornhill, London, E. C., England, this 16th day of October, 1900.

ROBERT BRYAN-HAYMES.

Witnesses:
PERCY E. MATTOCKS,
H. MAYKELS.